May 23, 1944.    A. RASPET    2,349,757
GYROSCOPIC INSTRUMENT
Filed March 17, 1941    2 Sheets-Sheet 1

INVENTOR
August Raspet
BY
Byerly Watson & Simonds
ATTORNEYS

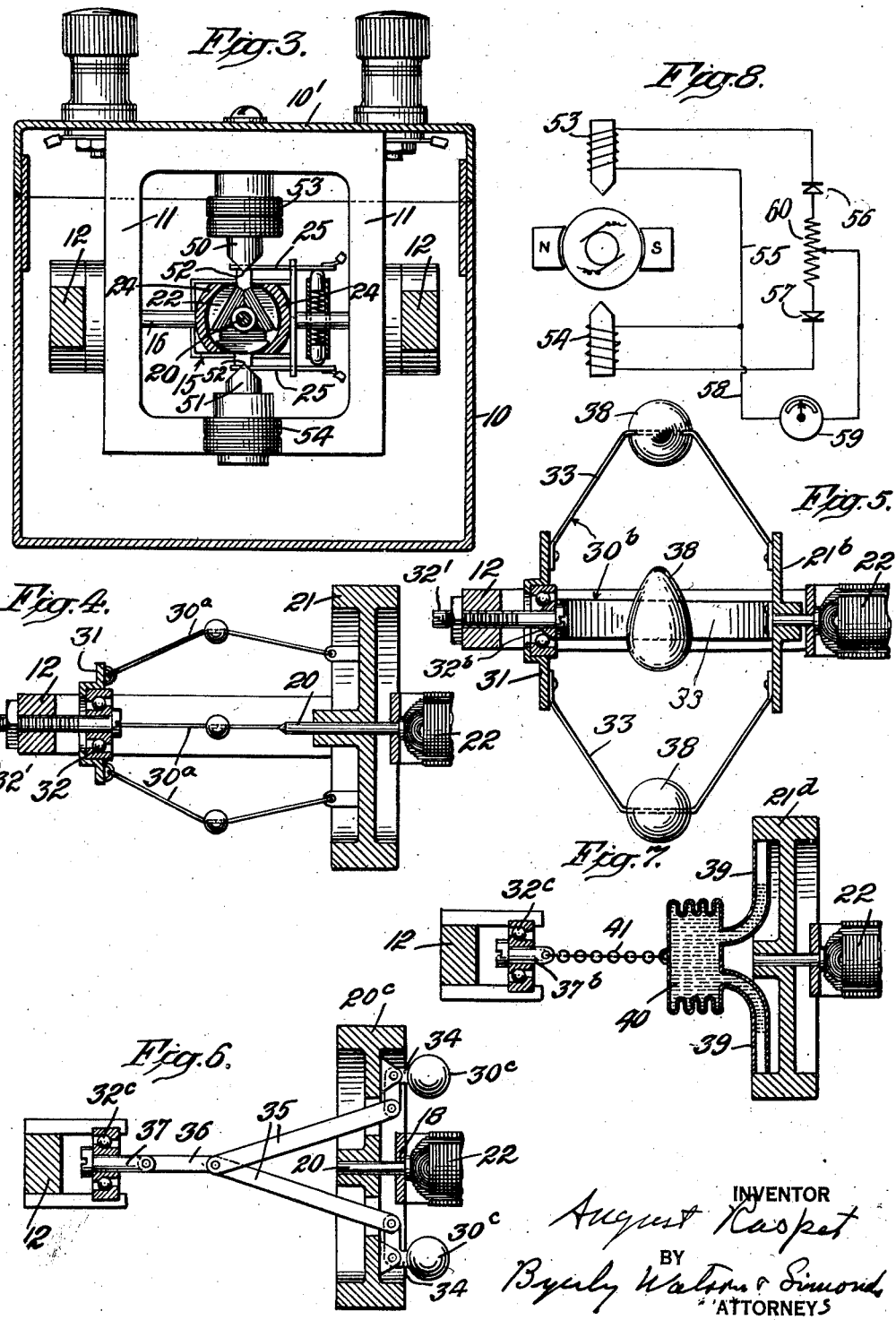

Patented May 23, 1944

2,349,757

UNITED STATES PATENT OFFICE 2,349,757

GYROSCOPIC INSTRUMENT

August Raspet, Hyattsville, Md.

Application March 17, 1941, Serial No. 383,761

8 Claims. (Cl. 33—204)

This invention relates to improvements in gyroscopic instruments and aims to provide a delicate and accurate gyroscopic instrument which may be manufactured at small cost.

Objects of my invention are to provide a gyroscopic instrument whose response is independent of the speed of rotation of the gyroscope rotor, and whose rotor is automatically self-dynamic-balancing.

In a preferred embodiment of my invention I attain these and other objects by utilizing centrifugal force developed by the rotation of the gyroscope rotor to oppose precession of the gyroscope and by providing an electrical indicator actuated by a magnetic element on the rotor of the gyroscope. The response of the indicator to precession is directly proportional to the speed of the rotor, and the precessing torque is also directly proportional to the speed of the rotor, so that if precession were opposed by a constant force the response of the indicator would vary directly as the square of the speed of the rotor. But, since precession is opposed by centrifugal force which varies directly as the square of the speed of the rotor, the effect of variations in rotor speed is balanced out so that the actual response of the indicator is independent of variations in the rotor speed.

The nature of this and other features of my invention may best be understood from a detailed description of the specific embodiments of my invention which are shown in the accompanying drawings in which Fig. 1 shows a gyroscopic turn indicator sectioned on a vertical plane containing the axis of the rotor of the gyroscope;

Fig. 3 is a transverse section taken on the line 3—3 of Fig. 1;

Figs. 4, 5, 6 and 7 are fragmentary views of the gyroscope rotor and the connection between it and the support, similar to the left-hand side of Fig. 1, showing modified centrifugal elements;

Fig. 8 is a diagram of the electric circuit of the indicator; and

Figure 1:
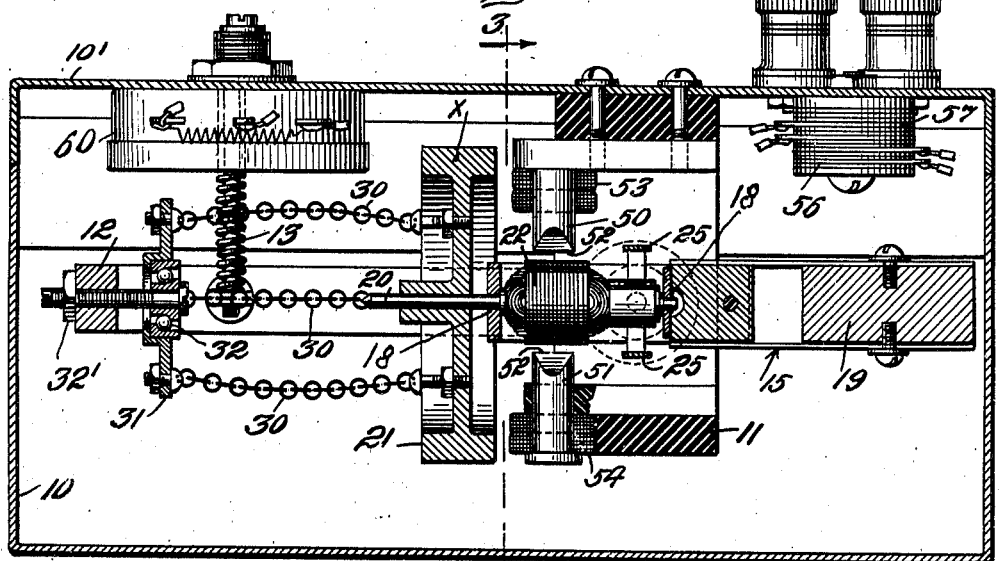

The support of the instrument illustrated consists of a box 10, a cover 10', an open transverse frame 11 secured to the cover, and an open longitudinal frame 12 which is supported at one end by the frame 11 and adjustably supported near the other end by a rod 13 depending from the cover.

The rotor-bearing frame 15 of the gyroscope is pivoted on the support. The pivot is formed by a cross-shaft 16 on the frame 15 journalled in ball bearings 17 mounted in the transverse frame 11 of the support. The frame 15 provides bearings 18 for the shaft 20 of the gyroscope rotor. The frame 15 also carries a weight 19 which is adjusted so as to place the center of gravity of the gyroscope on the axis of the pivot 16. The frame 15 may, if desired, be provided with any usual damping means.

The gyroscope rotor is electrically driven in the form illustrated. Its shaft 20 carries, in addition to the fly wheel 21, an armature 22 and a commutator 23 to which the winding of the armature is connected. The field pieces of the motor consist of permanent magnets 24 forming part of the gyroscope frame 15, and the brushes 25 are also carried by the frame 15 as best seen in Fig. 3.

Centrifugal elements are carried by the gyroscope rotor. In the form shown in Figs. 1 and 2, they consist of a plurality of slack chains equally spaced about the axis of the rotor and extending between the rotor fly wheel 21 and a disc 31 anchored to the support by means of a thrust ball bearing 32 secured to the end of the fixed frame 12 at a point of the support which lies on a line intersecting the axis of the pivot 16 at right angles. This line is the axis of the gyroscope rotor when the gyroscope is in its normal position. The parts described thus form a connection between the gyroscope and a point of the support which lies on the normal axis of the gyroscope rotor. This connection is tensioned by the centrifugal force of the chains when the rotor is in operation. The tension is, therefore, a direct function of the speed of rotation of the rotor. Since the tension force of the connection between the gyroscope and the support is along a line intersecting the axis of the pivot 16 at right angles, it offers a resistance to precession which is very slight at the beginning of a precession in either direction and which increases rapidly with a continuation of precession in either direction.

The strength of the force resisting the precession, which determines the sensitiveness of the instrument, depends upon the mass and the angle of the chains 30. The sensitiveness of the instrument may be regulated by means of the nut 32' which determines the position of the bearings 32 and the slackness of the chains.

Figure 2:
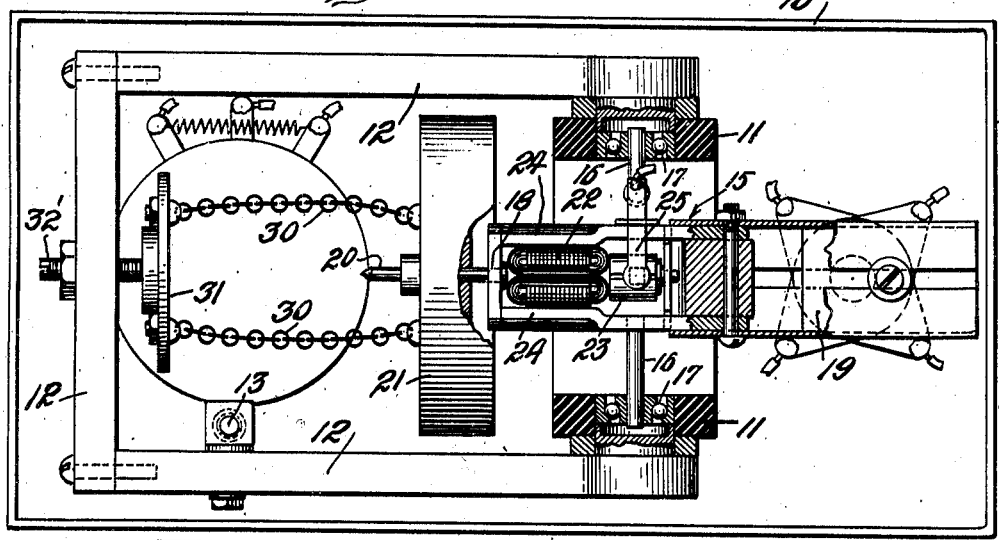
Fig. 2 is a bottom plan view with the box removed showing some parts sectioned on the axis of the rotor.

The centrifugal elements 30 have an important function in addition to that of resisting precession. They serve also to counteract the effect of any small eccentricity in the weight of the fly-wheel 21, and thus to make the gyroscope self-dynamic-balancing. Their freedom of movement is such that they act like a liquid which is free to move in a gyroscope rotor, and which, as is well known, automatically flows to the "light" side of the rotor to balance any eccentricity in the weight of the rotor. I have demonstrated by the actual operation of the device described that the centrifugal elements 30 reduce the vibration caused by eccentricity of the fly wheel to a point where it is imperceptible, and thus make the rotor, for all practical purposes, self-dynamic-balancing. This eliminates the large expense ordinarily necessary to produce a perfectly balanced gyroscope fly wheel. To accomplish this result, the mass of the chains 30 must be as great as, and preferably considerably greater than, any difference in weight between the two sides of the fly wheel. With a fly wheel machined with ordinary accuracy, light chains such as those shown in Figs. 1 and 2 are sufficient to effect self-dynamic-balancing as well as to provide a sufficient centralizing force to resist precession.

My invention is not limited to the use of chains as the centrifugal elements and does not require that the centrifugal elements be generally parallel to the rotor axis. Thus the chains 30 of Figs. 1 and 2 may be replaced by the centrifugal elements 30a shown in Fig. 4, which consist of flexible wires weighted at their middles and converging toward their point of anchorage to the support. The operation of the centrifugal elements 30a is like that of the chains 30.

My invention may be applied to produce a gyroscope which is perfectly self-balancing by placing substantially the entire effective mass of the gyroscope rotor in outwardly movable centrifugal elements. Such a gyroscope rotor is shown in Fig. 5 which, it will be noted, is similar to the construction shown in Figs. 1, 2, 4, except that the fly wheel 21 is replaced by a light disc 21b and the light centrifugal elements 30 are replaced by massive centrifugal elements 30b. This type of gyroscope may be made at small expense, as it is perfectly dynamically-self-balancing and also self-centralizing. By making the heavy centrifugal elements 30b slacker than the light chains 30 and mounting the disc 31 on a self-aligning bearing 32b, the restoring force produced by the elements 30b may be made approximately the same as the restoring force of the light chains 30 so that an instrument containing the rotor shown in Fig. 5 may be made as responsive to turns of the support as that shown in Fig. 1.

The massive centrifugal connecting elements 30b may take the form of heavy chains, but a feature of my invention consists in reducing air resistance by giving them a stream-lined form such as that shown in Fig. 5. In this form it will be seen that each element 30b consists of a flexible, inextensible ribbon 33 carrying a stream-lined weight 38 at its middle point. The rotor shown in Fig. 5 may easily be driven by power applied to either one of the discs 21b, 31.

My invention is not limited to the use of centrifugal elements which, like those already described, form part of a connection between the gyroscope and the support. In Fig. 6, the centrifugal elements 30c consist of balls or weight at the ends of short levers 34 pivoted on the fly wheel 20c of the rotor. The levers 34 are in the form of bell cranks connected by linkage 35, 36 to a stub shaft 37 anchored in a thrust ball bearing 32c fixed on the support at the same point as the bearing 32 of Fig. 1. The centrifugal force of the balls tensions the connection between the gyroscope and this point of the support with a force depending upon the speed of rotation of the rotor, so as to produce the same sort of resistance to precession as the centrifugal elements which have been described.

The centrifugal elements 30c also have the effect of automatically balancing any slight eccentricity in the fly wheel, as a ball on the "light" side of the fly wheel will move out further than one on the "heavy" side.

My invention is not limited to the use of solid centrifugal elements. Fluid centrifugal elements may also be used. In the arrangement shown in Fig. 7, the fly wheel 21d is provided with a plurality of equally spaced radial tubes 39 connecting at their inner ends with a flexible bellows 40 located on the axis of the fly wheel. The inner side of the bellows is held in fixed relation to the fly wheel by the tubes 39 or other means, and the outer side of the bellows is connected by a tension member 41 to the stub shaft 37b anchored in the thrust ball bearing 32c which was described in connection with Fig. 6. The centrifugal force of a liquid in the tubes 39 tends to draw the liquid out of the bellows 40 and thus produce a tension on the connection 41 which is dependent upon the rate of rotation of the fly wheel so that this device operates in resisting precession in the same way as those which have been described. The liquid centrifugal elements of Fig. 7 also make the rotor dynamically-self-balancing regardless of eccentricity in the weight of the fly wheel, since the liquid automatically runs out further in the tube 39 which is at the "light" side of the wheel until a perfect balance is obtained.

The precession indicator of the instrument is operated by an electric current induced in stationary coils by the magnetic field of a magnetic element on the gyroscope rotor. A useful feature of my invention which is, however, not absolutely essential, consists in utilizing the armature of an electric motor driving the rotor as the magnetic element which actuates the electric indicator.

The indicator shown in Figs. 1, 2, 3 and 8 includes two pole pieces 50, 51 of magnetic metal mounted on the transverse frame 11 of the support and presenting edges 52 extending into the magnetic field of the armature 22 of the electric motor. As best shown in Fig. 3, the pole pieces 50, 51 are located above and below the armature and between the field magnets 24 of the motor which form part of the frame 15. The pole pieces 50, 51 are provided with coils 53, 54 in each of which an alternating voltage is induced. The magnitude of the voltage induced in each coil depends upon the distance of its pole piece from the armature. Consequently, when the gyroscope precesses so as to move the armature upward, the induced voltage in the coil 53 is higher than that in the coil 54 and the reverse is the case when precession moves the armature downward.

As shown in Fig. 8, the coils 53, 54 are connected in series in a circuit 55 containing two rectifiers 56, 57. Shunted across the circuit 55 from a point between the two rectifiers to a point between the two coils is a circuit 58 containing a center-reading D. C. milliammeter 59 and a potentiometer 60. When the voltages in the coils 53, 54 are equal, no current flows through the ammeter, but, when either voltage exceeds the other, a rectified current flows through the ammeter so as to move its pointer in one direction or the other, thus indicating a precession of the gyroscope in one direction or the other due to a turning of the support in one direction or the other. The potentiometer 60 provides means for setting the pointer at its middle or zero position when the gyroscope is in its normal position, even though the voltages in the coils 53, 54 are not exactly equal when the gyroscope is in its normal position. It is, therefore, not essential that the pole pieces 50, 51 be at exactly equal distances from the armature in the normal position of the gyroscope.

Figure 9:
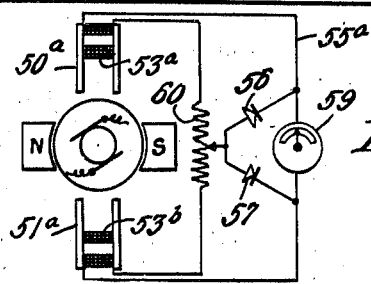
Fig. 9 shows a modified circuit.

In the modification shown in Fig. 9, the simple pole pieces 50, 51 are replaced by pole pieces 50a, 51a, each of which consists of two bars of magnetic metal connected by a core of magnetic metal which carries a winding. The windings or coils 53a, 53b may be connected in the circuit shown in Fig. 8. In Fig. 9, however, I have shown an alternative, and in some respects preferable, circuit. In this case, the ammeter 59 is connected in the coil circuit 55a and the rectifiers 56, 57 are shunted across this circuit at opposite sides of the ammeter.

The pole pieces 50, 51 or 50a, 51a are protected from stray magnetic fields by the box 10 and cover 10' which are made of iron so as to serve as a magnetic shield. This insures accurate operation of the electric indicator, and also prevents the electric motor of the turn indicator from affecting other electrical instruments in its vicinity.

The ammeter 59 may be placed at any desired distance from the gyroscope. The electric indicator which has been described thus has the advantage of making it unnecessary to place the gyroscope itself on the instrument board. The electric indicator is much more sensitive than the mechanical precession indicators used in ordinary gyroscopic instruments. This makes it possible to provide for a much smaller angular movement of the gyroscope frame than that which is required with mechanical indicators, giving the instrument a more accurate and more rapid response to turning movements of the support than can be obtained in instruments using mechanical indicators.

The response of the gyroscopic instrument which has been described is independent of variations of speed of the rotor of the gyroscope. For a given angular turning of the support, the precessing torque, $p$, is given by the following formula:

$$p = C_1 w$$

where $w$ is the rotational speed of the gyroscope rotor; and the restoring force, $r$, due to the centrifugal force of the centrifugal elements is given by the following formula:

$$r = C_2 w^2$$

The response of the pivoted frame of the gyroscope which is caused by the precessing torque and resisted by the centrifugal elements is therefore proportional to $$\frac{w}{w^2}$$

that is to say, it is inversely proportional to the speed of rotation of the rotor.

The voltage induced in the coils 53, 54 in any given position of the pivoted frame is given by the following formula:

$$V = C_3 w$$

and is therefore directly proportional to the speed rotation of the rotor.

A decrease in speed of the rotor increases the response of the pivoted gyroscope frame to a turn of the support in proportion to the change of speed, and at the same time decreases the response of the ammeter in proportion to the change in speed. The two effects therefore balance out, making the response of the ammeter to the turn precisely the same as it was before the decrease in rotational speed occurred. The same balancing out occurs on increases of the rotational speed, so that the response of the indicator is not affected by changes in the speed of the gyroscope rotor. In view of the difficulty of maintaining an absolutely constant speed of the gyroscope rotor, the instrument gives a uniformity of response to turns not heretofore obtainable.

The self-dynamic-balancing of the rotors, which has been described, makes it possible to manufacture the instrument which has been described, more economically than previously used gyroscopic instruments.

The advantages of my invention to which I have referred are independent of the particular means used for driving the rotor of the gyroscope. Any usual driving means may be substituted for the electric motor shown in the drawings, and the power may be applied to the disc or stub shaft mounted on the support instead of directly to the rotor journalled on the frame 15. Many other changes may be made in this specific instrument described and illustrated without departing from my invention.

The gyroscope construction illustrated and described in this application forms the subject matter of my application Serial No. 465,932 filed November 17, 1942 as a division of this application.

What I claim is:

1. A gyroscopic instrument comprising a support, a gyroscope having a rotor and a frame pivoted on the support to permit precession, a centrifugal element carried by the rotor, means for applying the centrifugal force of said element to resist precession, a magnetic element on the rotor, and an electric precession indicator actuated by the magnetic field of said magnetic element.

2. A gyroscopic instrument comprising a support, a gyroscope having a rotor and the frame pivoted on the support to permit precession, a centrifugal element carried by the rotor and connected to the support to resist precession by a force proportional to the square of the speed of the rotor, a magnetic element on the rotor, an induction coil on the support in the magnetic field of said magnetic element, so that the voltage induced therein is directly proportional to the speed of the rotor, and an electric indicator connected to said coil, whereby response of the indicator to turning movements of the support is independent of the speed of the rotor.

3. A gyroscopic instrument comprising a support, a gyroscope having a rotor and a frame pivoted on said support to permit precession, means for spinning the rotor, means actuated by the spinning of the rotor to create a force proportional to the square of the speed of the rotor, means for applying said force between the support and the gyroscope to resist precession, and precession indicating means whose response is directly proportional to the speed of the rotor, so that the response of said instrument to turning movements of the support is independent of the speed of the rotor.

4. A gyroscopic instrument comprising a support, a gyroscope having a rotor and a frame pivoted on the support to permit precession, centrifugal means carried by the rotor and connected to the support to resist precession of the gyroscope away from a normal position, a magnetic element on the rotor, induction coils on the support located at opposite sides of the magnetic element at approximately equal distances from it when the gyroscope is in its normal position, and rectifiers and an ammeter in circuit with said coils to indicate precession of the gyroscope from its normal position in either direction.

5. A gyroscopic instrument comprising a support, a gyroscope having a rotor and a frame pivoted on said support, an electric motor having its armature on the gyroscope rotor and its field on the gyroscope frame, centrifugal elements carried by the rotor connected to a point on the support in line with the axis of the rotor when the gyroscope is in its normal position to resist precession of the gyroscope in either direction from its normal position, induction coils on the support at opposite sides of the armature at substantially equal distances from the armature when the gyroscope is in its normal position, and rectifiers and an ammeter in circuit with said coils to indicate precession of the gyroscope from its normal position in either direction.

6. In a gyroscopic instrument, a support, a gyroscope having a rotor and a frame pivoted on the support, an electric motor having an armature on the rotor and a field on the frame, means for resisting precession of the gyroscope away from a normal position, induction coils on the support located at opposite sides of the armature at approximately equal distances from the armature when the gyroscope is in its normal position, and rectifiers and an ammeter in circuit with said coils to indicate precession of the gyroscope from its normal position in either direction.

7. In a gyroscopic instrument, a support, a gyroscope having a rotor and a frame pivoted on the support, an electric motor having an armature on the rotor and field pieces on the frame at the sides of the rotor, means for restoring the gyroscope to a normal position on the support, separate pole pieces on the support extending toward the armature between the field pieces of the motor and located at approximately equal distances from the armature when the gyroscope is in its normal position, and an electric indicator actuated by the magnetic flux produced in said pole pieces by the magnetic field of the armature.

8. In a gyroscopic instrument, a support, a gyroscope having a rotor and a frame pivoted on the support, a magnetic element on the rotor, pole pieces fixed on the support at opposite sides of the rotor and located in the magnetic field of said rotary magnetic element, coils on said pole pieces, an ammeter, an electric circuit connecting the coils and the ammeter in series, and rectifiers shunted across said circuit at opposite sides of the ammeter.

AUGUST RASPET.